United States Patent [19]

Thompson

[11] Patent Number: 4,650,321
[45] Date of Patent: Mar. 17, 1987

[54] SPATIAL/SPECTRAL REAL TIME IMAGING

[75] Inventor: Kevin P. Thompson, Danbury, Conn.

[73] Assignee: The Perkin-Elmer Corporation, Norwalk, Conn.

[21] Appl. No.: 751,921

[22] Filed: Jul. 5, 1985

[51] Int. Cl.⁴ .............................................. G01J 3/00
[52] U.S. Cl. ..................................... 356/73; 356/305; 356/328
[58] Field of Search ............... 356/300, 305, 308, 328, 356/334, 73, 121

[56] References Cited

U.S. PATENT DOCUMENTS

| | | | |
|---|---|---|---|
| 3,363,525 | 1/1968 | Teeple, Jr. | 356/305 |
| 3,992,099 | 11/1976 | Laughlin | 356/305 |
| 4,037,959 | 7/1977 | Bumgardner | 356/73 |
| 4,146,332 | 3/1979 | Moore | 356/308 |
| 4,320,462 | 3/1982 | Lund et al. | 356/121 |
| 4,346,992 | 8/1982 | Schwartz | 356/73 |

Primary Examiner—F. L. Evans
Attorney, Agent, or Firm—Thomas P. Murphy; Edwin T. Grimes; Francis L. Masselle

[57] ABSTRACT

Apparatus and method are disclosed for obtaining from a two dimensional field of view containing numerous unresolved sources of irradiation of various unknown wavelengths, the wavelengths incident on objects in the field using significantly fewer pixels than required if a conventional imaging spectrometer were employed. A reflective telescope (10, 12) includes a concave reflective grating (14) after the secondary mirror (12). Undiffracted radiation from the grating forms an image on a first detector array (16). Diffracted radiation forms an image on a second detector array (18). The zero order images provide spatial identification of the objects and a set of wavelength independent reference locations from which the relative displacement of the diffracted radiation provides spectral information.

8 Claims, 3 Drawing Figures

SPATIAL/SPECTRAL REAL TIME IMAGING

TECHNICAL FIELD

This invention relates to optical surveillance. More specifically, the invention pertains to surveillance of a two dimensional scene to simultaneously determine, in real time, the identification of objects in a field and the wavelength of monochromatic radiation which may be emitted or reflected from the objects from nearby sources.

BACKGROUND ART

The closest known instrument to which this invention pertains is the slitless spectrometer. A typical slitless spectrometer consists of an astronomical, two mirror telescope with a plane grating placed between the secondary mirror and the photographic plate. When a star field is photographed, the images on the plate are the spectrum of each star placed at the position of the star. In this manner information is obtained on both the spatial location and the wavelength of many sources in the field simultaneously.

The detector array of a conventional imaging spectrometer in the diffracted order of the grating must provide $M \times N \times W$ pixels (picture elements) where $M \times N$ is the number of spatial resolution elements in the two dimensional scene and W is the number of spectral resolution elements. For a system to provide a two dimensional field of view with both modest spatial resolution and wavelength resolution, this product, $M \times N \times W$, becomes prohibitively large.

DISCLOSURE OF INVENTION

This invention comprises a telescope system, which includes a diffracting component, capable of imaging a strip field of view onto an array of radiation detectors. Rather than using one large ($M \times N \times W$) array in the diffracted order, two smaller arrays are employed. One array, the spatial array, of size ($M \times N$), is positioned at the image plane of the zero order (undiffracted) beam from the diffracting component. This array receives spatial information for the identification of the objects in the field of view. This array also displays the spatial locations of focused radiation incident on the objects from outside of the field of view. These spatial locations are independent of the wavelength of the source. A second array, the spectral array, of size ($M \times (N+W)$), is positioned at the image plane of the first order diffracted beam, at the central wavelength of interest, which is spatially separated from the zero order image plane. This array provides information on the location of the same incident radiation as seen in the spatial array but the location of the sensed radiation in the spectral array is wavelength dependent. If the sources are monochromatic and unresolved, only ($M \times (2N+W)$) pixels are required rather than the ($M \times N \times W$) necessary to obtain the same information from a conventional imaging spectrometer. This substantial decrease in the required number of pixels can greatly increase the achievable resolution in spatial or wavelength information using current detector technology, which is inherently pixel number limited.

BEST MODE FOR CARRYING OUT THE INVENTION

Under certain circumstances, it might be desirable to be able to optically view a field and determine not only the spatial location and type of objects within the field but the wavelength of radiation incident on them from unknown sources. It might also be highly desirable to perform this function in real time. One application for such a function could be military wherein a battlefield is the field of view. If objects such as tanks within such a field were being irradiated by monochromatic laser light, it might be desirable to quickly determine the wavelength of the laser radiation in order to invoke suitable countermeasures.

Figure 1:
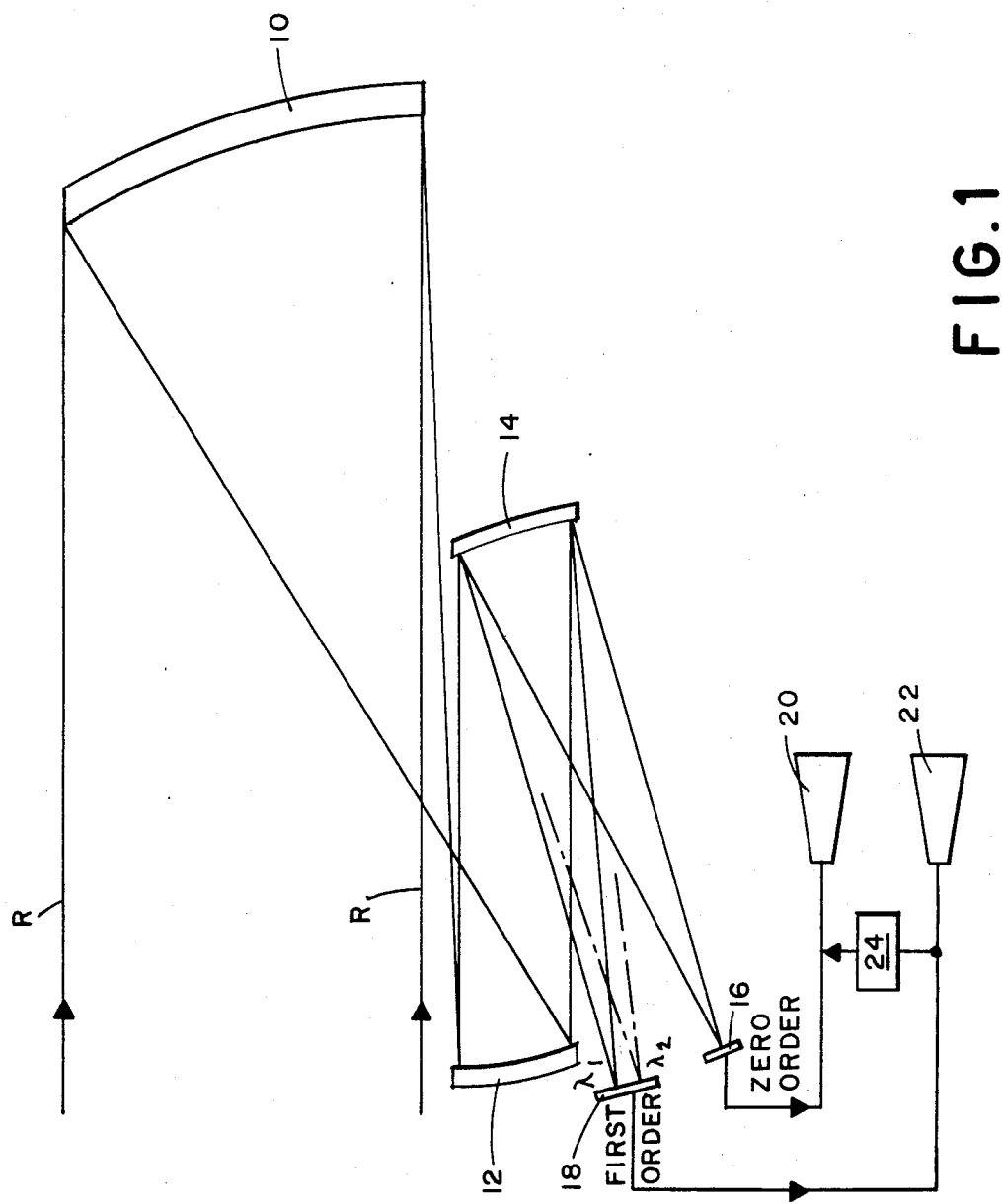
FIG. 1 is a diagrammatic illustration of a telescope system embodying the present invention.

With particular reference to FIG. 1, there is illustrated a Mersenne telescope arrangement positioned to receive the rays R from a field of view. It comprises a primary mirror 10 and secondary mirror 12, together with the usual field stop and Lyot stop (not shown). The radiation from the secondary mirror 12 is directed to a concave reflective optical grating 14. Two rectangular arrays of radiation detectors are positioned to receive the radiation reflected and diffracted from the grating 14. These may be, for example, arrays of charge-coupled devices (CCDs).

A spatial array 16 is positioned to receive the zero order (undiffracted) radiation reflected from grating 14. This would nominally be broadband. This array might be, for example, 500 (M) pixels wide and 50 (N) pixels high. A strip field (i.e., $M \neq N$) is necessary to achieve the appropriate image quality.

A spectral array 18 of similar detectors is positioned to receive radiation diffracted in first order at the central wavelength of interest from the grating 14. As will be understood by those skilled in the art, the exact position of a source in the field imaged by the grating 14 is wavelength dependent. In a representative embodiment, the spectral array 18 may be 500 (M) pixels wide and 100 (N+W) pixels high.

The output signals from arrays 16 and 18 may be processed, displayed, or stored in a number of ways. FIG. 1 illustrates the output from the spatial array 16 being supplied to a cathode ray tube (CRT) 20 and the output of the spectral array 18 being supplied to the input of a CRT 22. However, the spectral information from the spectral array 18 may be combined with the spatial information, for example, by means of a signal processor 24 which may be utilized to combine the outputs into a single display. In such a case, one cathode ray tube, such as CRT 22 may be eliminated.

Figure 2:
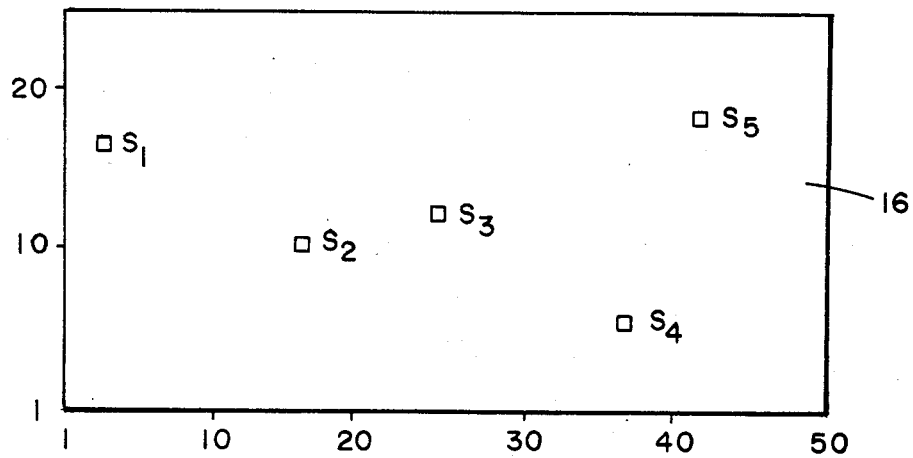
FIG. 2 is an illustration of the output of the spatial array of the invention.
Figure 3:
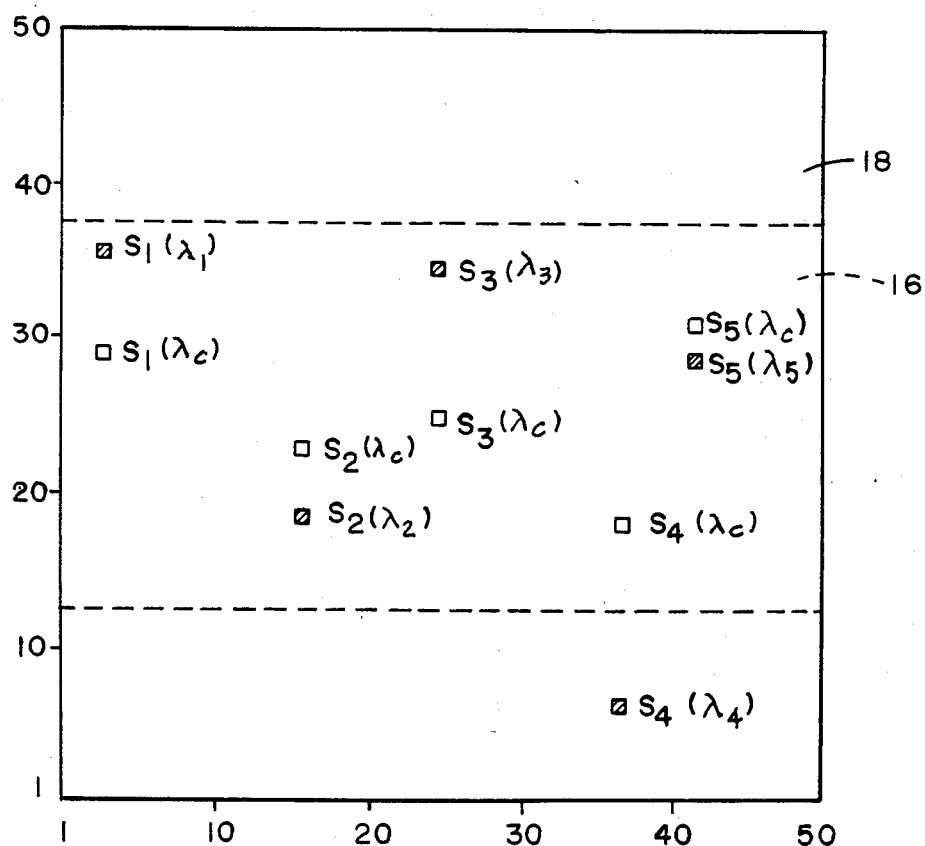
FIG. 3 is a diagram of the output of the spectral array of the invention, the spatial array being shown superimposed thereon.

FIGS. 2 and 3 illustrate, in a simplified form, the manner in which the apparatus of the invention functions. FIG. 2 illustrates a $50 \times 25$ pixel portion of the spatial array 16. In this figure five different simultaneous detections of focused radiation on objects in the field of view are shown, labeled $S_1$–$S_5$, respectively. By "unresolved" focused irradiation it is meant that each source subtends only one pixel. In terms of a pixel numbered grid, the coordinates of $S_1$, for example, would be 3, 16 and those of $S_3$ would be 24, 12. These locations are independent of the wavelength of the irradiating sources.

FIG. 3 illustrates a corresponding 50×50 pixel portion of the spectral array 18. On this array the pixel numbers at which the focused radiation is detected are wavelength dependent, as the radiation is diffracted before reaching the array. The difference between the detected location of a source in the spectral array and the detected location in the spatial array (shown as dashed in FIG. 3 for reference) provides the wavelength information. If each pixel corresponds to one (1%) percent of the wavelength $\lambda_c$, then the wavelength of the unknown sources can be readily obtained from the following calculations:

|  | Row | Column |
|---|---|---|
| $S_1(\lambda_1)$ | 36 | 3 |
| $S_1(\lambda_c)$ | 28.5 | 3 |
| $\lambda_1 = \lambda_c + (36-28.5) \times 1\% \lambda_c$ | | |
| $S_2(\lambda_2)$ | 18 | 15 |
| $S_2(\lambda_c)$ | 22.5 | 15 |
| $\lambda_2 = \lambda_c + (18-22.5) \times 1\% \lambda_c$ | | |
| $S_5(\lambda_5)$ | 28 | 42 |
| $S_5(\lambda_c)$ | 30.5 | 42 |
| $\lambda_5 = \lambda_c + (28-30.5) \times 1\% \lambda_c$ | | |

It will be understood that the foregoing description in connection with FIG. 3 is primarily for purposes of illustration. Although the undiffracted images and first order "hits" could be simultaneously displayed upon the same screen, many other methods of display and signal treatment could be employed. For example, the spatial image from array 16 could be pictorially displayed while the spectral information could be rapidly computed and printed out alongside each irradiated object.

As an example of an instrument which might be constructed in accordance with the invention, one might assume an aperture diameter of the primary mirror 10 of 600 millimeters and a field of view of 2.0×0.2 degrees. The spectral resolution might be one (1%) percent $\lambda_c$ and the spatial resolution could be 0.1 milliradian. The pixel size could be 0.25×0.25 millimeter and the grating could have a bandpass of one octave. The array sizes could be 500 by 50 pixels for the zero order array and 500 by 100 pixels for the first order array. Note that, while this instrument would contain 75000 pixels, the equivalent imaging spectrometer would require 1,250,000 pixels to obtain the same information.

It is believed that the many advantages of this invention will now be apparent to those skilled in the art. It will also be apparent that a number of variations and modifications may be made therein without departing from its spirit and scope. Accordingly, the foregoing description is to be construed as illustrative only, rather than limiting. This invention is limited only by the scope of the following claims.

What is claimed is:

1. The method of identifying irradiated objects and the wavelengths of substantially monochromatic electromagnetic radiation emanating from the irradiated objects in a two dimensional strip field of view where the size of the irradiated region on the objects remains unresolved which comprises:
providing an optical imaging system including a diffracting component arranged to project a first image of said field in zero order undiffracted radiation and a second image of said field in a diffracted order;
positioning a first array of radiation responsive detectors to receive said first image;
identifying the objects of interest in said field of view from the output of the detectors in said first array;
determining the spatial location of unresolved irradiated regions on said objects;
positioning a second array of radiation responsive detectors to receive said second image; and
determining the wavelength of the focused radiation incident of each such object of interest by the location of the detectors in said second array responding to such radiation.

2. The method of claim 1 wherein said diffracted order radiation is first order radiation.

3. The method of claim 1 wherein each of said arrays comprises a rectangular field of detectors arranged in horizontal rows and vertical columns, the number of columns being substantially greater than the number of rows.

4. The method of claim 3 wherein the number of rows in said second array exceeds the number of rows in said first array and wherein the wavelength of radiation is determined by the row within said array containing the responding detector.

5. The method of claim 1 wherein at least one of said first and second arrays activates a respective viewing screen comprising an arrangement of pixels corresponding to the radiation responsive detectors in said array.

6. Apparatus for identifying objects and the wavelength of substantially monochromatic electromagnetic radiation emanating from the objects in a strip field of view which comprises:
a reflective optical telescope including a primary mirror adapted to receive radiation from said field and a secondary mirror positioned to receive and redirect radiation from said primary mirror;
a reflective optical grating positioned to receive and direct radiation from said secondary mirror;
a first array of radiation responsive detectors positioned to receive zero order radiation reflected from said grating;
a second array of radiation responsive detectors positioned to receive higher order radiation diffracted from said grating;
means responsive to the output of said first array for producing spatially accurate image of the field of view; and
means responsive to the outputs of said first and second arrays for determining the displacements of higher order images formed on said second array relative to their respective zero order images formed on said first array,
whereby the wavelength of radiation forming each of said higher order images may be determined from said displacement.

7. The apparatus of claim 6 wherein each detector of said first and second arrays corresponds to a pixel of the final image output and wherein the size of each pixel bears a known relationship to the wavelength of the center frequency of said zero order radiation.

8. The apparatus of claim 7 wherein each of said detectors is a charge coupled device.

* * * * *